US011303739B2

(12) United States Patent
Cao (10) Patent No.: US 11,303,739 B2
(45) Date of Patent: Apr. 12, 2022

(54) MOBILE TERMINAL AND CONTROL METHOD THEREFOR (71) Applicant: XI'AN Zhongxing New Software Co., Ltd., Shaanxi (CN)

(72) Inventor: Li Cao, Guangdong (CN)

(73) Assignee: XI'AN ZHONGXING NEW SOFTWARE CO., LTD., Xi'An (CN)

(*) Notice: Subject to any disclaimer, the term of this patent is extended or adjusted under 35 U.S.C. 154(b) by 0 days.

(21) Appl. No.: 16/627,959

(22) PCT Filed: Feb. 2, 2018

(86) PCT No.: PCT/CN2018/075080
§ 371 (c)(1),
(2) Date: Dec. 31, 2019

(87) PCT Pub. No.: WO2019/007053
PCT Pub. Date: Jan. 10, 2019

(65) Prior Publication Data
US 2020/0137207 A1 Apr. 30, 2020

(30) Foreign Application Priority Data
Jul. 5, 2017 (CN) .................. 201710543642.X (51) Int. Cl.
H04M 1/00 (2006.01)
H04M 1/02 (2006.01)
(Continued)

(52) U.S. Cl.
CPC ....... H04M 1/0214 (2013.01); H04M 1/0233 (2013.01); H04M 1/0235 (2013.01);
(Continued)

(58) Field of Classification Search
CPC .............. H05K 5/0017; H04M 1/0235; H04M 1/0266; H04M 2250/16; H04M 1/0214; H04M 1/0233; H04M 1/725
See application file for complete search history.

(56) References Cited

U.S. PATENT DOCUMENTS 8,353,598 B2    1/2013   Estevez et al.
8,860,656 B1 * 10/2014   Cho ..................... G06F 1/3265
                                                          345/102
(Continued)

FOREIGN PATENT DOCUMENTS

CN      1375153 A     10/2002
CN    101605155 A     12/2009
(Continued)

OTHER PUBLICATIONS

Chinese First Office Action and Search Report for Application for Application No. 201710543642.X, dated Aug. 27, 2020, 18 pages including English translation.
(Continued)

Primary Examiner — Nhan T Le
(74) Attorney, Agent, or Firm — Morgan, Lewis & Bockius LLP (57) ABSTRACT A mobile terminal and a control method therefor including a primary body having a first display screen and at least one secondary body having a second display screen. An accommodating mechanism and a first connection mechanism are provided on at least one side of the primary body. The first connection mechanism has a retracted state accommodated in the accommodating mechanism and an extended state popped up from the accommodating mechanism. A second connection mechanism is provided on at least one side of the secondary body. The extended first connection mechanism is connected to the connection mechanism so that the primary body and the secondary body are combined into a multi-screen terminal.

20 Claims, 9 Drawing Sheets (51) Int. Cl.
 *H04M 1/725* (2021.01)
 *H05K 5/00* (2006.01)

(52) U.S. Cl.
 CPC ......... *H04M 1/0266* (2013.01); *H04M 1/725* (2013.01); *H05K 5/0017* (2013.01); *H04M 2250/16* (2013.01)

(56) References Cited

U.S. PATENT DOCUMENTS

| | | | |
|---|---|---|---|
| 2004/0005184 | A1 | 1/2004 | Kim et al. |
| 2006/0061695 | A1* | 3/2006 | Endo ................. G06F 1/1615 348/739 |
| 2010/0045569 | A1 | 2/2010 | Estevez et al. |
| 2014/0362507 | A1* | 12/2014 | Kinoshita ............ G06F 1/1618 361/679.09 |

FOREIGN PATENT DOCUMENTS

| | | |
|---|---|---|
| CN | 102692960 A | 9/2012 |
| CN | 102692960 A | 9/2012 |
| CN | 203287832 U | 11/2013 |
| CN | 103744477 A | 4/2014 |
| CN | 103941813 A | 7/2014 |
| CN | 104320503 A | 1/2015 |
| CN | 104320503 A | 1/2015 |
| CN | 104796504 A | 7/2015 |
| CN | 104796504 A | 7/2015 |
| CN | 206135999 U | 4/2017 |

OTHER PUBLICATIONS

Chinese Second Office Action for Application No. 201710543642.X, dated Feb. 22, 2021, 8 pages including English translation.
International Search Report for Application No. PCT/CN2018/075080, dated Apr. 19, 2018, 5 pages including English translation.

* cited by examiner

MOBILE TERMINAL AND CONTROL METHOD THEREFOR

CROSS REFERENCE TO RELATED APPLICATION

This application is the United States National Phase of PCT Patent Application No. PCT/CN2018/075080 filed on 2 Feb. 2018, which claims the priority of Chinese Patent Application with the application number 201710543642.X filed on Jul. 5, 2017, the content of which is incorporated by reference herein in its entirety.

TECHNICAL FIELD

The present disclosure relates to the field of electronic device technologies, and in particular to, a mobile terminal and a method for controlling the mobile terminal.

BACKGROUND

With the development of electronic technology, in order to enhance user experience and the added value of portable electronic devices, the implementation of portable electronic devices is becoming more and more abundant. For mobile phones, for example, the existing art proposes the concept of a flip dual-screen phone. The flip dual-screen phone uses two interconnected display screens, and folds and unfolds the two display screens to meet the user's various needs. When better audio-visual enjoyment is required, the two display screens are unfolded and combined to form a large screen; when talking or carrying, the two display screens are folded.

However, since the existing flip dual-screen phone is of an integrated structure, and the folding and unfolding of the two display screens requires the necessary structural support and protection, the existing flip dual-screen phone has a problem of the whole phone with excessive large thickness. At present, the thickness of the existing flip dual-screen phone is usually about 10 mm. For users who are looking for a better feel of the ultra-thin bar phone, the existing flip dual-screen phone looks like a heavy "brick phone", which seriously affects the user experience.

SUMMARY

The technical problem to be solved by embodiments of the present disclosure is to provide a mobile terminal and a control method therefor, which solve the problem of the existing flip dual-screen phones with the excessive large thickness.

In order to solve the above technical problems, an embodiment of the present disclosure provides a mobile terminal, including a primary body with a first display screen and at least one secondary body with a second display screen, at least one side of the primary body being provided with a accommodation mechanism and a first connection mechanism, and the first connection mechanism having a retracted state in which the first connection mechanism is accommodated in the accommodation mechanism and a protruded state in which the first connection mechanism is ejected from the accommodation mechanism; at least one side of the secondary body being provided with a second connection mechanism: the first connection mechanism in the protruded state being configured to connect with the second connection mechanism to make the primary body and the secondary body be combined into a multi-screen terminal.

In an implementation of an embodiment of the present disclosure, the accommodation mechanism includes an accommodation cavity and an ejection mechanism, and the accommodation cavity is configured to accommodate the first connection mechanism and the ejection mechanism is configured to make the first connection mechanism be ejected from the accommodation cavity.

In an implementation of an embodiment of the present disclosure, the ejection mechanism includes a push frame, a groove, a link, and a ejection spring; the push frame is disposed in the accommodation cavity, and one end of the push frame is abutted against the first connection mechanism, and the other end of the push frame is connected to a movable end of the ejection spring, and a fixed end of the ejection spring is fixedly connected to the primary body; the groove is provided in the push frame, and its top is a symmetrical sliding lock structure, and a through-hole is provided at the bottom; a fixed end of the link is fixedly connected to the primary body, and a movable end is inserted into the through-hole of the groove.

In an implementation of an embodiment of the present disclosure, the ejection mechanism is disposed at, a middle portion of the accommodation cavity, or is disposed, at both ends of the accommodation cavity, respectively.

In an implementation of an embodiment of the present disclosure, the first connection mechanism includes a main housing, a connection shaft and a connection wire provided in an inner cavity of the main housing, and the connection shaft and the connection wire are configured to electrically connect with the secondary body.

In an implementation of an embodiment of the present disclosure, a surface of the main housing is provided with a strip-shaped position-limiting groove extending in an axial direction, and a raised operating lever is provided on the connection shaft, and the raised operating lever is slidably disposed in the position-limiting groove, and the operating lever is configured to control the connection shaft to retract or protrude from the main housing.

In an implementation of an embodiment of the present disclosure, an inner surface of the connection shaft is provided with a reed, one end of the connection wire connects with the primary body and is conductive, and the other end extends into the connection shaft, connects with the inner surface reed of the connection shaft and is conductive.

In an implementation of an embodiment of the present disclosure, an outer surface of the connection shaft is provided with a reed or a gold finger configured to electrically connect with the second connection mechanism.

In an implementation of an embodiment of the present disclosure, the connecting wire is a spring cable, and the spring cable includes a rod-shaped cable and a spring, and the spring is nested on the rod-shaped cable.

In an implementation of an embodiment of the present disclosure, the first connection mechanism further includes a detection component, and the detection component is configured to detect a conducting state between the first connection mechanism and the second connection mechanism, and further provide a control signal for controlling a working mode of the mobile terminal.

In an implementation of an embodiment of the present disclosure, the detection component includes a detection reed, a single-screen detection contact, and a multi-screen detection contact, and the detection reed is disposed on the connection shaft, and the single-screen detection contact and the multi-screen detection contact are arranged on an inner wall of a position-limiting groove, respectively; when the detection reed is in contact with the single-screen detection contact to be conductive, control signal for the mobile terminal in a single-screen working mode is provided; when the detection reed is in contact with the multi-screen detection contact to be conductive, a control signal for the mobile terminal in a multi-screen working mode is provided.

In an implementation of an embodiment of the present disclosure, the second connection mechanism includes a secondary housing, and a jacking cylinder and a jacking spring arranged in the secondary housing, and an inner surface of the secondary housing is provided with a gold finger or a reed configured to contact with the connection shaft of the first connection mechanism to be conductive; one end of the jacking spring is connected to the secondary body, and the other end is connected to the jacking cylinder, and the jacking spring is configured to make the jacking cylinder be tightly abutted against the connection shaft of the first connection mechanism.

In an implementation of an embodiment of the present disclosure, the connection shaft is a conical rod body, and a diameter of an end of the conical rod body adjacent to the second connection mechanism is smaller than a diameter of an end away from the second connection mechanism; the secondary housing has a conical hollow cavity, and a diameter of an end of the conical hollow cavity adjacent to the first connection mechanism is larger than a diameter of an end away from the first connection mechanism.

In an implementation of an embodiment of the present disclosure, the gold finger or the reed on the inner surface of the secondary housing is disposed at an end away from the first connection mechanism, and the reed or the gold finger on the outer surface of the connection shaft is disposed an end adjacent to the second connection mechanism, so that the reed or gold finger on the outer surface of the connection shaft is not in contact with the gold finger or reed on the inner surface of the secondary housing when the connection shaft is partially inserted into the hollow cavity of the secondary housing, and the reed or gold finger on the outer surface of the connection shaft is in complete contact with the gold finger or reed on the inner surface of the secondary housing only when the connection shaft is completely inserted into the hollow cavity of the secondary housing.

In order to solve the above technical problems, an embodiment of the present disclosure further provides a mobile terminal, including a primary body having a first display screen, and at least one side of the primary body is provided with a accommodation mechanism and a first connection mechanism for combining a multi-screen terminal, and the first connection mechanism has a retracted state in which the first connection mechanism is accommodated in the accommodation mechanism and an protruded state in which the first connection mechanism is ejected from the accommodation mechanism.

In an implementation of an embodiment of the present disclosure, the accommodation mechanism includes an accommodation cavity and an ejection mechanism, and the accommodation cavity is configured to accommodate the first connection mechanism, and the ejection mechanism is configured to make the first connection mechanism be ejected from the accommodation cavity.

In an implementation of an embodiment of the present disclosure, the ejection mechanism is disposed at a middle portion of the accommodation cavity, or is disposed at both ends of the accommodation cavity, respectively; the first connection mechanism includes a main housing, a connection shaft and a connection wire provided in an inner cavity of the main housing.

In an implementation of an embodiment of the present disclosure, the first connection mechanism further includes a detection component, and the detection component includes a detection reed, a single-screen detection contact, and a multi-screen detection contact, and the detection reed is disposed on the connection shaft, and the single-screen detection contact and the multi-screen detection contact are arranged on an inner wall of the position-limiting groove, respectively; when the detection reed is in contact with the single-screen detection contact to be conductive, control signal for the mobile terminal in a single-screen working mode is provided; when the detection reed is in contact with the multi-screen detection contact to be conductive, a control signal for the mobile terminal in a multi-screen working mode is provided.

An embodiment of the present disclosure further provides a control method for a mobile terminal, wherein the mobile terminal includes a detection component, and the detection component includes a detection reed, a single-screen detection contact, and a multi-screen detection contact; the control method includes:

providing a control signal for the mobile terminal in a single-screen working mode when it is determined that the single-screen detection contact and the detection reed are conductive;

providing a control signal for the mobile terminal in a multi-screen working mode when it is determined that the multi-screen detection contact and the detection reed are conductive.

In an implementation of an embodiment of the present disclosure, providing the control signal for the mobile terminal in the single-screen working mode when it is determined that the multi-screen detection contact and the detection reed are conductive, including:

when it is determined that the multi-screen detection contact and the detection reed are conductive, further determining whether a connection shaft of the primary body and a gold finger of a secondary housing are conductive, and if yes, providing a control signal for the mobile terminal in the multi-screen working mode, otherwise providing a control signal for the mobile terminal in the single-screen working mode.

The embodiments of the present disclosure provide a mobile terminal d control method therefore. The mobile terminal can be freely switched between a flip dual-screen phone and an ultra-thin bar phone by designing a connection structure between two display screens as a detachable mechanism. The two display screens can be connected and conductive through a detachable connection mechanism, which can be used as the dual-screen mobile phone. The two display screens can be detached and separated, and the primary body can be used as the ultra-thin bar phone alone with only the thickness of 6 mm. By adopting the embodiments of the present disclosure, not only the problem of the existing flip dual-screen phone with excessive large thickness is effectively solved, but also reliable signal transmission achieved by using reeds and, gold fingers and accurate signal connection achieved by using position-limiting grooves and slot structure are ensured, so that the detachable mechanism integrating mechanical and electrical connections has the characteristics of simple structure, reliable connection, and convenient disassembly and assembly. The embodiments of the disclosure has novelty design, and a great prospect of application.

In an implementation of an embodiment of the present disclosure, the embodiments of the present disclosure further provide a mobile terminal and control method therefore, and multi-level detection is adopted so as to ensure that only when the connection between the primary body and the secondary body has been completed, the conversion of a single-screen working mode to a multi-screen working mode is activated, thereby avoiding the screen display confusion caused by a user or by mobile phone hardware and software failures and having high working reliability.

The mobile terminal of the embodiments of the present disclosure can not only realize the free conversion of the dual-screen mobile phone to the ultra-thin bar phone, but also realize modular upgrade of the mobile phone. For example, a rear camera of the original dual-screen mobile phone has 5 million pixels, and can be upgraded to 13 million pixels by replacing the secondary body. As, another example, the display screen of the original secondary body has a lower resolution, and it can be upgraded to a high-definition screen by replacing the display screen of the secondary body. For another example, the secondary body can also have its own memory, and the effect of upgrading the memory of the entire phone can be achieved by replacing the secondary body.

Of course, it is not necessary for any product or method of the present disclosure to achieve all the advantages described above at the same time. Other features and advantages of the present disclosure will be explained in the following embodiments in the description, and parts of features and advantages become apparent from the embodiments in the description, or are understood by implementing the present disclosure. Objects and other advantages of the embodiments of the present disclosure can be achieved and obtained through the structures specifically pointed out in the description, claims, and accompanying drawings.

BRIEF DESCRIPTION OF THE DRAWINGS

The accompanying drawings are used to provide a further understanding of technical solutions of the present disclosure, and constitute a part of the description, and used to explain the technical solutions of the present disclosure together with the embodiments of the present disclosure, and do not constitute a limitation on the technical solutions of the present disclosure. The shapes and sizes of the components in the accompanying drawings do not reflect the act al scale, but are only intended to illustrate the present disclosure.

DETAILED DESCRIPTION

The specific implementations of the present disclosure will be further described in detail below in conjunction with the accompanying drawings and the embodiments. The following embodiments are intended to illustrate the present disclosure without any intention to be used for limiting the scope of the present disclosure. It should be noted that, in the case of no conflict, the embodiments in the present disclosure and features therein may be arbitrarily combined with each other.

First Embodiment

Figure 1:
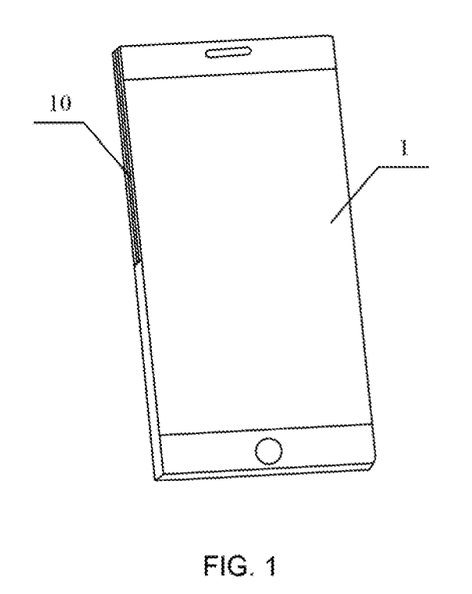
FIG. 1 is a schematic diagram of a first connection mechanism in a retracted state of a mobile terminal according to an embodiment of the present disclosure.
Figure 2:
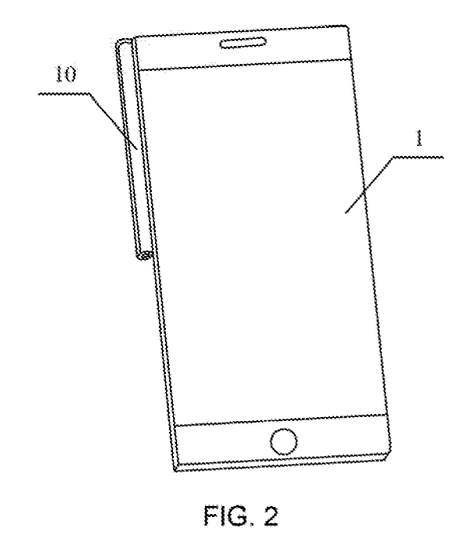
FIG. 2 is a schematic diagram of a first connection mechanism in a protruded state of a mobile terminal according to an embodiment of the present disclosure.

For the problem of the existing flip dual-screen phones with excessive large thickness, an embodiment of the present disclosure provides a mobile terminal. FIG. 1 is a schematic diagram of a first connection mechanism in a retracted state of a mobile terminal according to an embodiment of the present disclosure, and FIG. 2 is a schematic diagram of a first connection mechanism in a protruded state of a mobile terminal according to an embodiment of the present disclosure, A main structure of the mobile terminal in the embodiment includes a primary body 1 and a first connection mechanism 10. The primary body 1 includes a first display screen and an accommodation mechanism. The first display screen is disposed on the front surface of the primary body 1 and the accommodation mechanism is disposed on the side surface of the primary body 1. The first connection mechanism 10 has a retracted state and a protruded state. When in the retracted state, the first connection mechanism 10 is disposed in the accommodation mechanism, as shown in FIG. 1. At this time, the primary body 1 operates alone as an ultra-thin bar phone. When in the protruded state, the first connection mechanism 10 is ejected from the accommodation mechanism, as shown in FIG. 2. At this time, the primary body 1 is used as a primary body of a dual-screen mobile phone, and is connected and combined with the secondary body through the first connection mechanism 10 to form an unfolded or folded dual-screen or multi-screen mobile phone.

Figure 3:
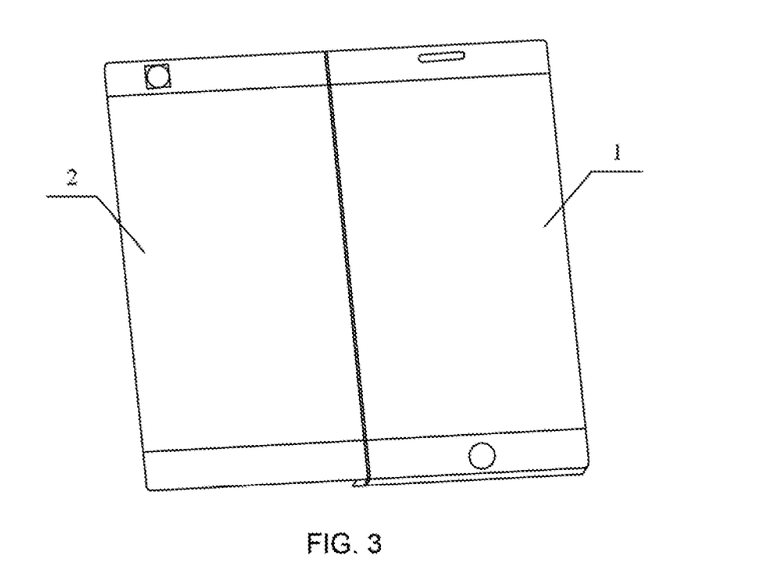
FIG. 3 is a schematic front diagram of the connected primary body and secondary body in an unfolded state according to an embodiment of the present disclosure.
Figure 4:
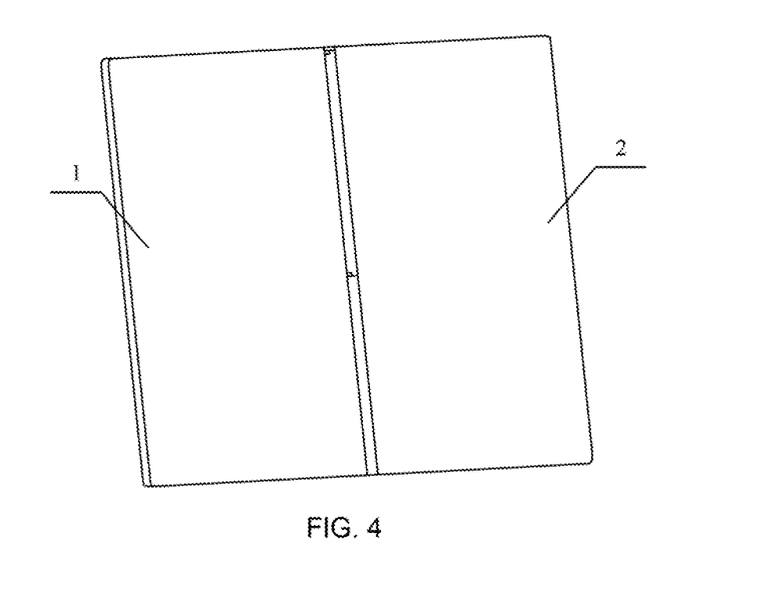
FIG. 4 is a schematic rear diagram of the connected primary body and secondary body in an unfolded state according to an embodiment of the present disclosure.
Figure 5:
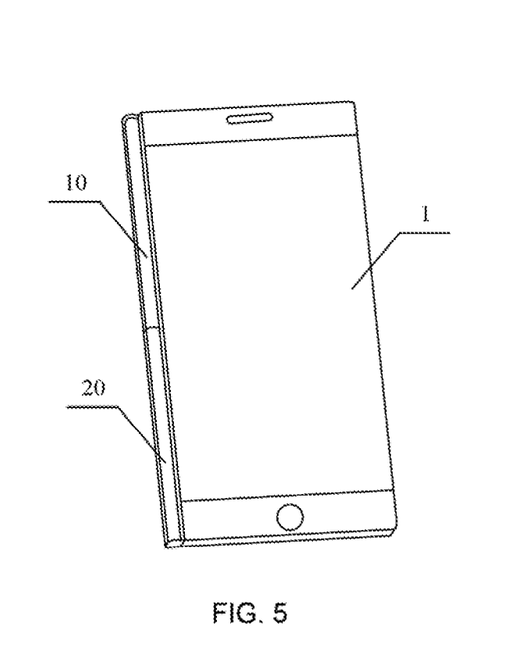
FIG. 5 is a schematic front diagram of the connected primary body and secondary body in a folded state according to an embodiment of the present disclosure.
Figure 6:
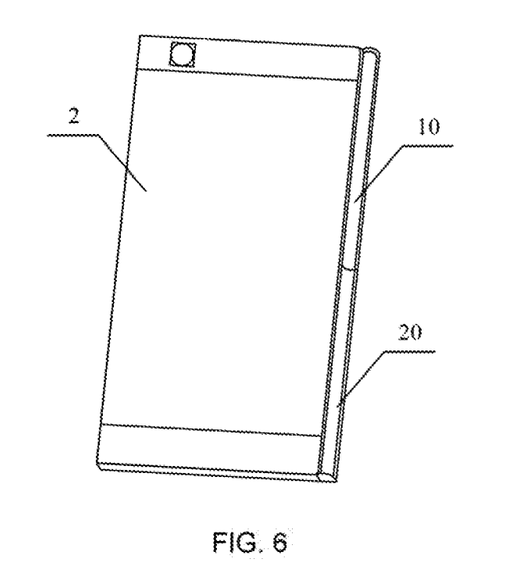
FIG. 6 is a schematic rear diagram of the connected primary body and secondary body in a folded state according to an embodiment of the present disclosure.

The main structure of the mobile terminal in the embodiment of the present disclosure further includes a secondary body 2 and a second connection mechanism 20. The secondary body 2 includes at least a second display screen. The secondary body 2 is configured to connect and combined with the primary body 1 through the second connection mechanism 20 to form an unfolded or folded dual-screen or multi-screen phone. FIG. 3 is a schematic front diagram of the connected primary body and secondary body in an unfolded state according to an embodiment of the present disclosure, FIG. 4 is a schematic rear diagram of the connected primary body and secondary body in an unfolded state according to an embodiment of the present disclosure, FIG. 5 is a schematic front diagram of the connected primary body and secondary body in a folded state according to an embodiment of the present disclosure, and FIG. 6 is a schematic rear diagram of the connected primary body and secondary body in a folded state according to an embodiment of the present disclosure. When the first connection mechanism 10 is in the protruded state, the primary body 1 and the secondary body 2 may be combined into a dual-screen mobile phone by connecting the first connection mechanism 10 with the second connection mechanism 20. The dual-screen phone has at least two states: the unfolded state and folded state. When the dual-screen mobile phone is in the unfolded state, the first display screen of the primary body 1 and the second display screen of the secondary body 2 are arranged side by side to form a large display screen with a screen doubled, as shown in FIGS. 3 and 4. When the dual-screen mobile phone is in the folded state, the first display screen of the primary body 1 and the second display screen of the secondary body 2 are stacked together to form two display screens consisting of the front surface and rear surface, as shown in FIGS. 5 and 6.

The first connection mechanism of the embodiment of the present disclosure is a movable structure, and may switch between the retracted and protruded states by pressing. Specifically, in the retracted state, the first connection mechanism may be ejected from the accommodation mechanism by pressing two ends or the middle of the first connection mechanism; in the protruded state, the first connection mechanism may be retracted into the accommodation mechanism by pressing the two ends or the middle of the first connection mechanism. When the first connection mechanism is retracted into the accommodation mechanism, the primary body may operate alone as an ultra-thin bar phone with thin thickness, which is convenient to carry and use.

Figure 7:
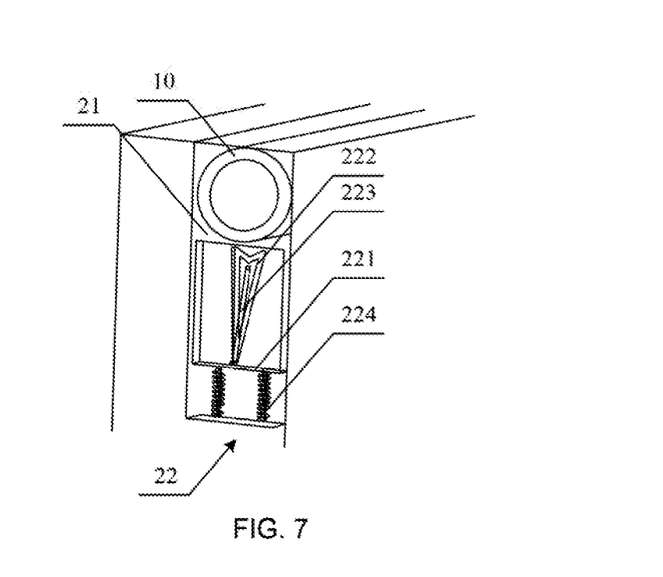
FIG. 7 is a schematic structural diagram of a first connection mechanism in a retracted state according to an embodiment of the present disclosure.
Figure 8:
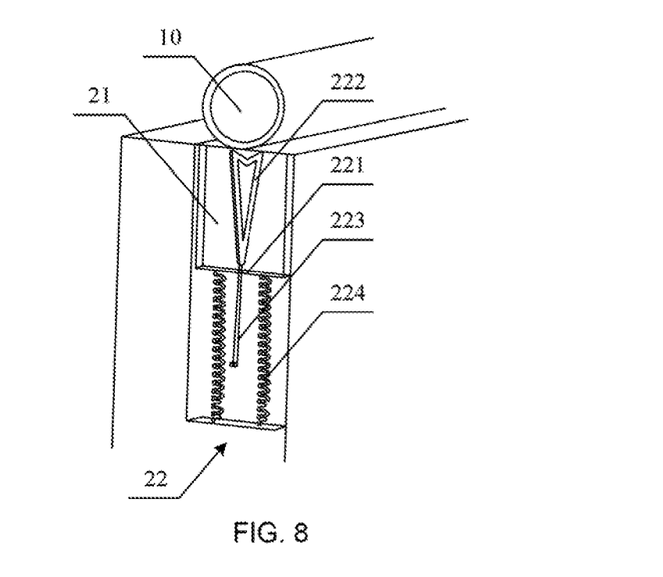
FIG. 8 is a schematic structural diagram of a first connection mechanism in a protruded state according to an embodiment of the present disclosure.
Figure 9:
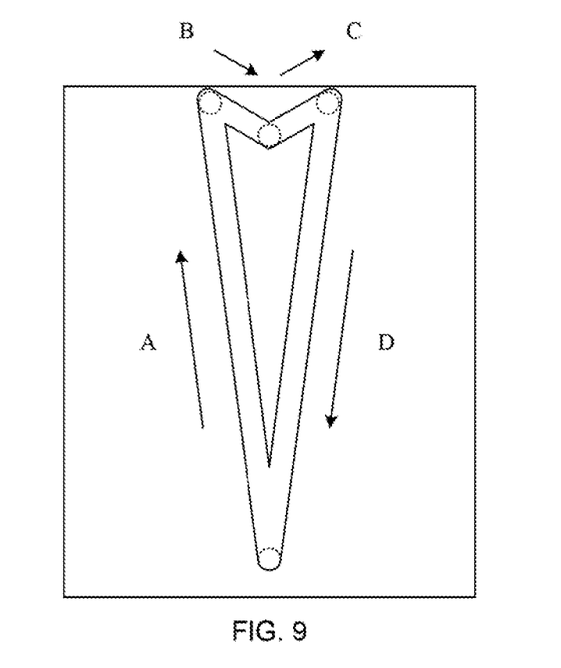
FIG. 9 is a working principle diagram of retracting and ejecting a first connection mechanism according to an embodiment of the present disclosure.

FIG. 7 is a schematic structural diagram of a first connection mechanism in a retracted state according to an embodiment of the present disclosure, FIG. 8 is a schematic structural diagram of a first connection mechanism in a protruded state according to an embodiment of the present disclosure, and FIG. 9 is a working principle diagram of retracting and ejecting a first connection mechanism according to an embodiment of the present disclosure. As shown in FIGS. 7, 8 and 9, the accommodation mechanism in the embodiment of the present disclosure includes an accommodation cavity 21 and an ejection mechanism 22. The accommodation cavity 21 is configured to accommodate the first connection mechanism 10, and the ejection mechanism 22 is configured to make the first connection mechanism 18 be ejected from the accommodation cavity 21. In actual implementation, the ejection mechanism 22 may be provided at the middle position of the accommodation cavity 21, and at this time, the middle portion of the first connection mechanism may be pressed to achieve the retracted and protruded states; or one ejection mechanism 22 may be provided at each of both ends of the accommodation cavity 21, respectively, and at this time, the two ends of the first connection mechanism may be simultaneously pressed to achieve the retracted and protruded states. Specifically, the ejection mechanism 22 includes a push frame 221, a groove 222, a link 223, and an ejection spring 224. The push frame 221 is disposed in the accommodation cavity 21, an upper end is disposed below the first connection mechanism, and a lower end is connected to a movable end of the ejection spring 224. The groove 222 is provided in the push frame 221, and its top is a symmetric sliding lock structure, and its bottom is provided with a through-hole into which the link 223 is nested. The link 223 is a rod body. A lower end of the link 223 is a fixed end and is fixedly connected to the primary body 1. An upper end of the link 223 is a movable end, which is inserted into the through-hole at the lower end of the groove 222 and is movable in the groove 222. An upper end of the ejection spring 224 is a movable end and connected to the push frame 221, and its lower end is a fixed end and fixedly connected to the primary body 1. In actual implementation, the groove may be a heart-shaped groove.

When the first connection mechanism 10 is in the protruded state (an ejected state), the movable end (upper end) of the link 223 is at the bottom of the groove 222. When the first connection mechanism 10 needs to be retracted, the middle of the first connection mechanism 10 is pressed or both ends of the first connection mechanism 10 is pressed simultaneously, the ejection spring 224 is compressed downward, and the movable end of the link 223 moves toward the upper left direction (as shown in the direction A in FIG. 9) along the groove 222, until it reaches the upper left vertex of the groove 222. At this time, the first connection mechanism 10 is released, and the first connection mechanism 10 moves upward due to the rebound force of the ejection spring 224. At the same time, the movable end of the link 223 falls back to the top midpoint of the groove 222 in the direction B, and at this time, the first connection mechanism 10 is in the retracted state, as shown in FIG. 7.

When the first connection mechanism 10 is in the retracted state, the movable end (upper end) of the link 223 is at the top of the groove 222. When the first connection mechanism 10 needs to be ejected, the middle portion of the first connection mechanism 10 is pressed again or both ends of the first connection mechanism 10 is pressed simultaneously, and the movable end of the link 223 moves toward the upper right direction (as shown in the direction C in FIG. 9) along the groove 222, until it reaches the upper right vertex of the groove 222. At this time, the first connection mechanism 10 is released. The first connection mechanism 10 moves upward due to the rebound force of the ejection spring 224. At the same time, the movable end of the link 223 falls back to the bottom of the groove 222 in the direction D, and at this time, the first connection mechanism 10 is ejected and in the protruded state, as shown in FIG. 8.

Figure 10:
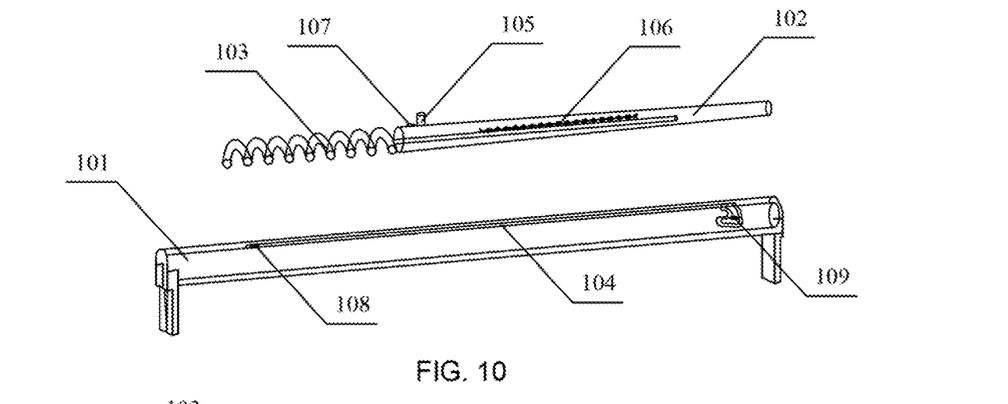
FIG. 10 is a schematic structural diagram of a first connection mechanism according to an embodiment of the present disclosure.
Figure 11:
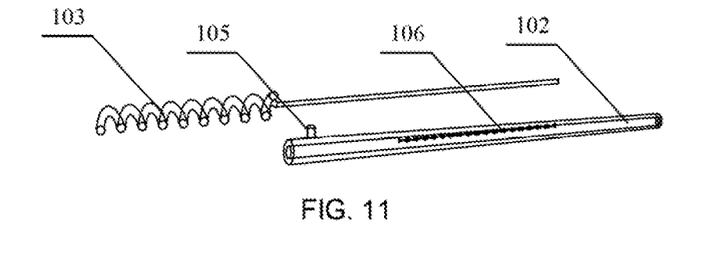
FIG. 11 is a schematic structural diagram of a connection shaft and a spring cable according to an embodiment of the present disclosure.

FIG. 10 is a schematic structural diagram of a first connection mechanism according to an embodiment of the present disclosure, and FIG. 11 is a schematic structural diagram of a connection shaft and a spring cable according to an embodiment of the present disclosure. As shown in FIGS. 10 and 11, the main structure of the first connection mechanism 10 includes a main housing 101, a connection shaft 102, and a spring cable 103 as a connection wire or signal line. The connection shaft 102 and the spring cable 103 are both provided in the hollow cavity of the main housing 101, a position-limiting groove 104 for accommodating an operating lever 105 is provided on a surface of the main housing 101. The position-limiting groove 104 is a strip-shaped groove and extends along the axial direction of the main housing 101. The connection shaft 102 is a hollow rod body, and a series of reeds 106 are provided on an outer surface and a hollow inner surface of the rod body. The surface of the end of the connection shaft 102 away from the second connection mechanism (or the end adjacent to the spring cable 103) is provided with a raised operating lever 105. When the connection shaft 102 is inserted into the hollow cavity of the main housing 101, the raised operating lever 105 is slidably disposed in the position-limiting groove 104 of the main housing 101 and is exposed from the position-limiting groove 104. The exposed operating lever 105 is higher than the surface of the main housing 101, so that a user may drive the connection shaft 102 to move along the position-limiting groove 104 by pulling the operating lever 105, and then control the connection shaft 102 to make it b protruded axially from the main housing 101 or retracted into the main housing 101, The spring cable 103 is a combination of a spring and a cable, and may in the form of a structure having a rod-shaped cable as center and a spring nested outside the rod-shaped cable. A diameter of the spring cable 103 is less than 0.5 mm. One end of the spring cable 103 is connected with the primary body and conductive, and the other end may extend into the inner cavity of the connection shaft 102 and connect with a series of reeds 106 on the inner cavity surface of the connection shaft 102 and be conductive, thereby making the connection shaft 102 and the spring cable 103 together realize the electrical connection between the primary body 1 and the secondary body 2. The structural design of the embodiment of the present disclosure not only enables the spring cable 103 to maintain signal transmission during the process of protruding and retracting of the connection shaft 102, but also provides necessary elastic force for the connection shaft 102.

In addition, in order to realize the on/off control of signals between the primary body 1 and the secondary body 2, a detection component is further provided in the embodiment. The detection component is configured to detect the conductive state between the first connection mechanism and the second connection mechanism, and provide control signal for control working modes of the mobile terminal. The detection component includes a detection reed 107, a single-screen detection contact 108, and a multi-screen detection contact 109. The detection reed 107 is disposed on the connection shaft 102. The single-screen detection contact 108 and the multi-screen detection contact 109 are disposed on an inner wall of the position-limiting groove 104, respectively, and the control signal is provided by means of the relative position between the connection shaft 102 and the position-limiting groove 104. Specifically, the detection reed 107 is disposed at the end of the connection shaft 102 away from the second connection mechanism (or the end adjacent to the spring cable 103), and is located near the operating lever 105. The single-screen detection contact 108 is disposed on the inner wall at the starting point of the position-limiting groove 104, and the multi-screen detection contact 109 is disposed on the inner wall at the finishing point of the position-limiting groove 104. In this way, when the operating lever 105 is located at the starting point of the position-limiting groove 104 (the connection shaft 102 is in the retracted state), the single-screen detection contact 108 is in contact with the detection reed 107 to be conductive, and the detection component provides the control signal for controlling, the mobile terminal to make it in the single-screen working mode, and there is no electrical signal and data signal for the connection shaft 102. When the operating lever 105 is located at the finishing point of the position-limiting groove 104 (the connection shaft 102 is in the protruded state), the multi-screen detection contact 109 is in contact with the detection reed 107 to be conductive, and the detection component provides the control signal for controlling the mobile terminal to make it in the multi-screen working mode.

Figure 12:
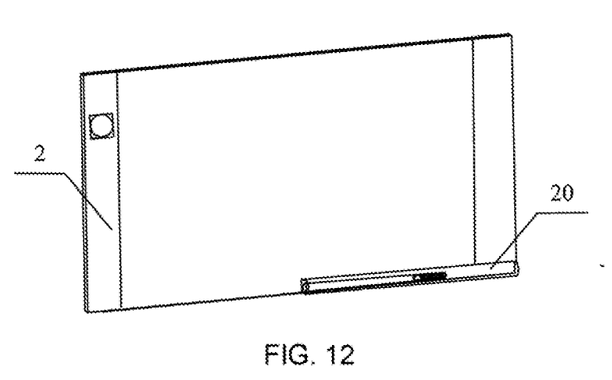
FIG. 12 is a schematic structural diagram of a second connection mechanism according to an embodiment of the present disclosure.
Figure 13:
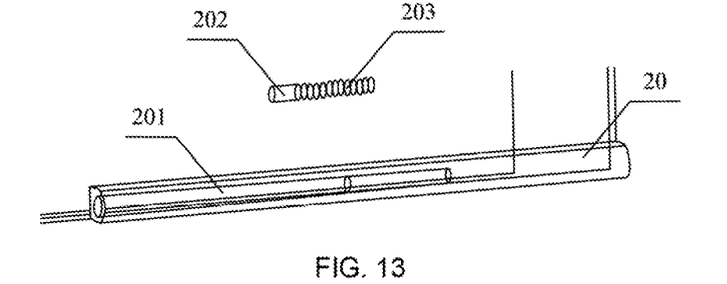
FIG. 13 is a schematic structural diagram of a jacking cylinder and a jacking spring according to an embodiment of the present disclosure.

FIG. 12 is a schematic structural diagram of a second connection mechanism according to an embodiment of the present disclosure, and FIG. 13 is a schematic structural diagram of a jacking cylinder and a jacking spring according to an embodiment of the present disclosure. As shown in FIGS. 12 and 13, the second connection mechanism 20 is disposed on the side surface of the secondary body 2, and the main structure includes a secondary housing 201, a jacking cylinder 202, and a jacking spring 203. The secondary housing 201 is a hollow structure, and its inner surface is provided with a ring-shaped gold finger, and the gold finger is configured to contact with the connection shaft 102 of the first connection mechanism 10 to be conductive. The jacking cylinder 202 and the jacking spring 203 are arranged in the hollow cavity of the secondary housing 201. One end of the jacking spring 203 is connected to the secondary body 2 and the other end is connected to the jacking cylinder 202. The jacking force of the jacking cylinder 202 is provided using the reaction force caused by compressing the jacking spring 203, so that the jacking cylinder 202 is tightly abutted against the end of the connection shaft 102 of the first connection mechanism 10, thereby generating a torque required when the dual-screen is flipped.

In this embodiment, both the outer shape of the connection shaft 102 and the hollow cavity of the secondary housing 201 are designed as a conical structure. Specifically, the connection shaft 102 is a conical rod body, and the diameter of the end of the conical rod body adjacent to the second connection mechanism is smeller than the diameter of the end away from the second connection mechanism. The secondary housing 201 has a conical hollow cavity, and the diameter of the end of the conical hollow cavity adjacent to the first connection mechanism is larger than the diameter of the end away from the first connection mechanism. The gold finger on the inner surface of the secondary housing is disposed at the end away from the first connection mechanism and the reed on the outer surface of the connection shaft is disposed at the end adjacent to the second connection mechanism, so that the connection shaft 102 is partially inserted into the hollow cavity of the secondary housing 201. The reed 106 on the outer surface of the connection shaft 102 is spaced apart at a certain distance from the gold finger on the inner surface of the secondary housing 201, and thus is unable to be conductive. Only when the connection shaft 102 is completely inserted into the hollow cavity of the secondary housing 201, the reeds 106 on the outer surface of the connection shaft 102 is in contact with the gold finger on the inner surface of the secondary housing 201 to be conductive. Therefore, it is possible to reduce the lateral wear of the reed 106 against the inner surface of the secondary housing 201 when the connection shaft 102 is inserted, increasing the working reliability and prolonging the service life.

In actual implementation, electrical connection structure between the connection shaft and the secondary housing may also be designed such that the gold finger is provided on the outer surface of the connection shaft and the reed is provided on the inner surface of the secondary housing, so that the outer surface of the connection shaft is similarly in contact with the inner surface of the secondary housing and is conductive.

The technical solution of the present disclosure will be further explained through the connection process between the primary body and the secondary body.

Figure 14:
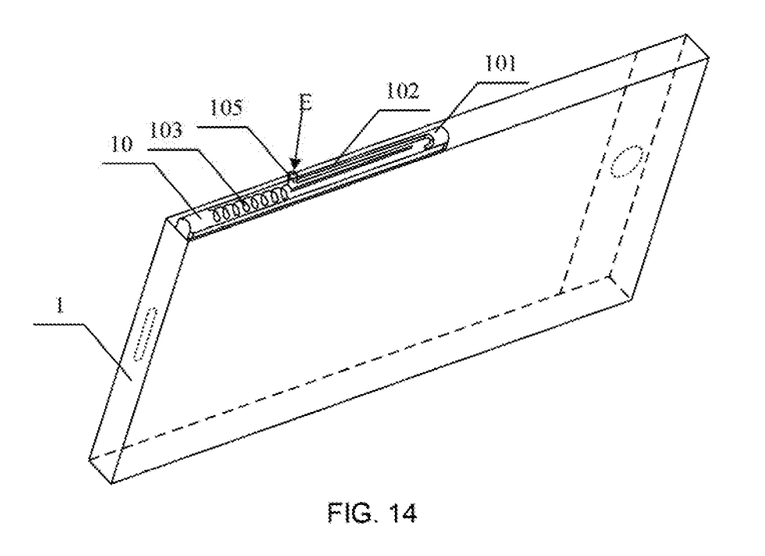
FIGS. 14-20 are schematic diagrams of a dual-screen connection according to an embodiment of the present disclosure.

When a dual-screen connection is required, the following operations are mainly performed:

First, the first connection mechanism 10 of the primary body 1 is pressed to eject out. At this time, the operating lever 105 is in the position E, the spring cable 103 is in an unexpanded state, and the connection shaft 102 is still in the cavity of the main housing 101, as shown in FIG. 14.

Figure 15:
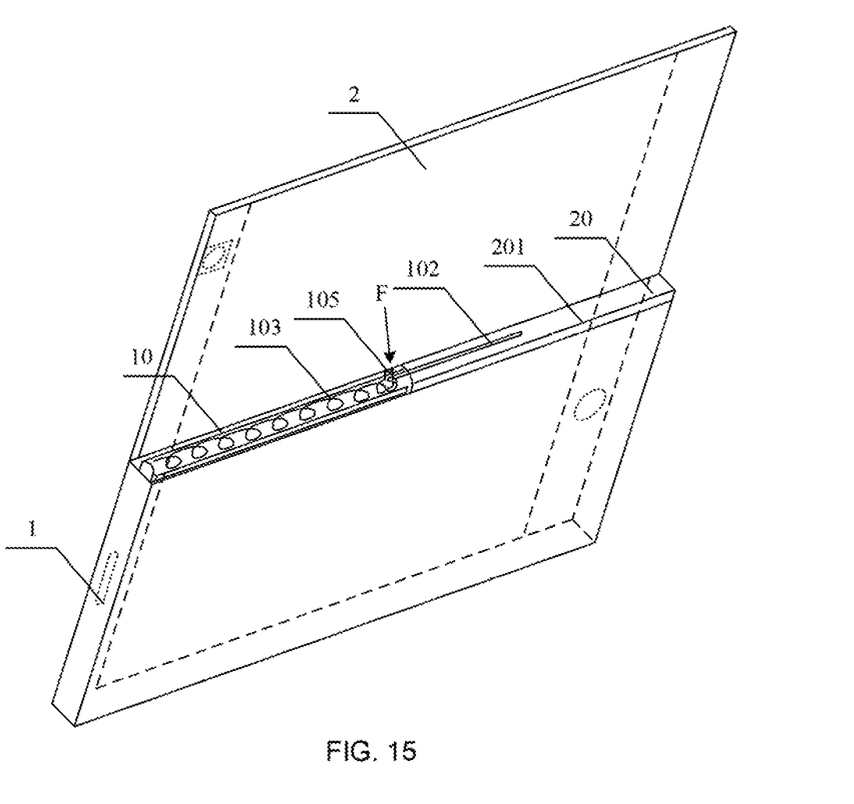
Figure 16:
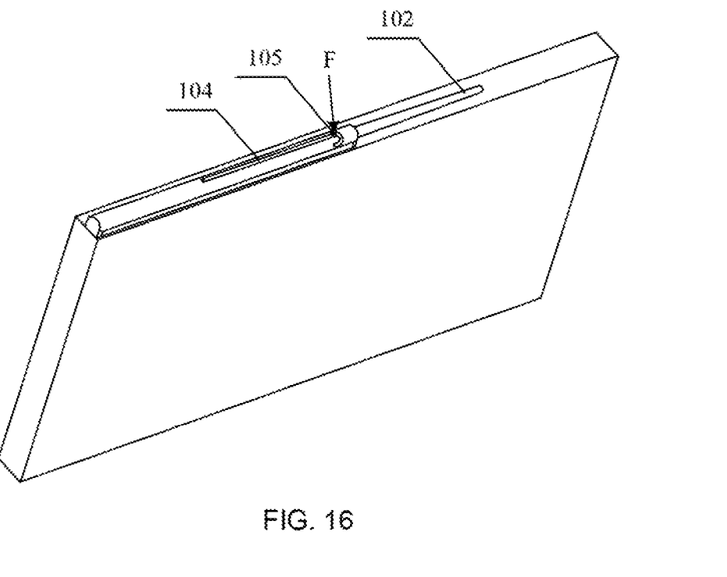

Next, the second connection mechanism 20 of the secondary body 2 is aligned with the first connection mechanism 10 of the primary body 1, and the operating lever 105 is pulled to move the operating lever 105 along the position-limiting groove 104 to the position F. At this time, the connection shaft 102 is extended into the secondary housing 201 of the hollow structure of the second connection mechanism 20, and the spring cable 103 is expanded accordingly, as shown in FIGS. 15 and 16.

Figure 17:
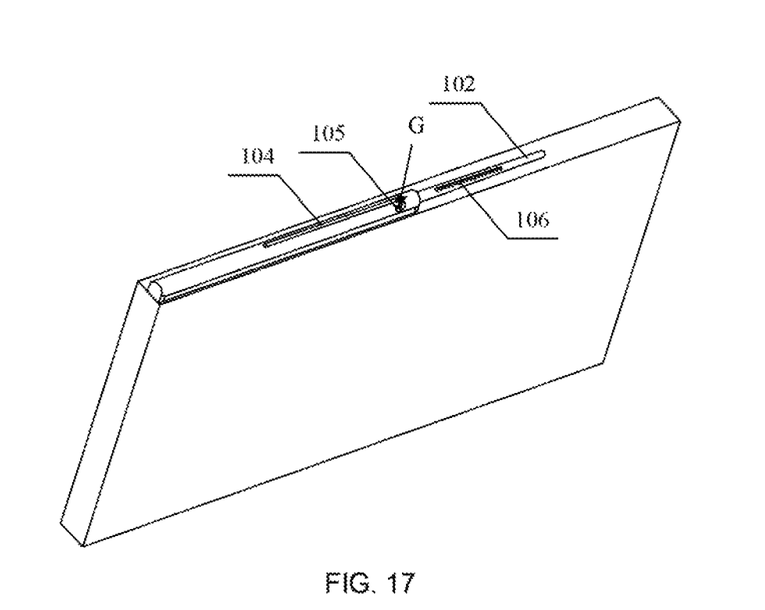
Figure 18:
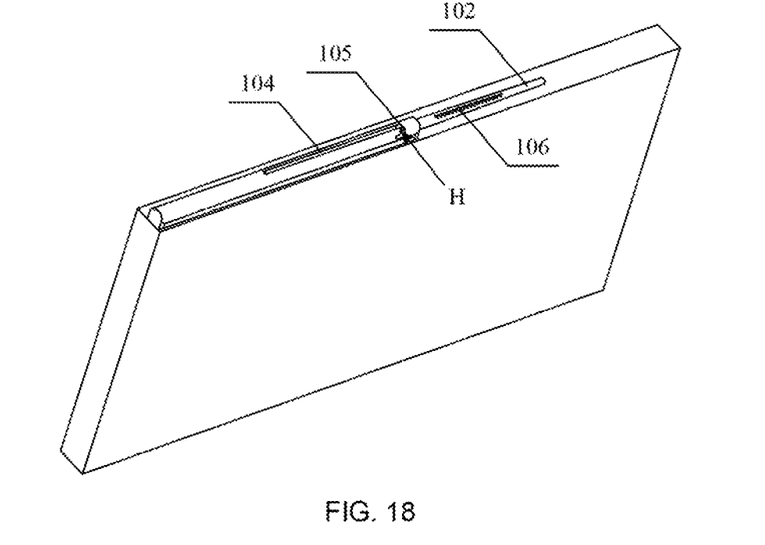
Figure 19:
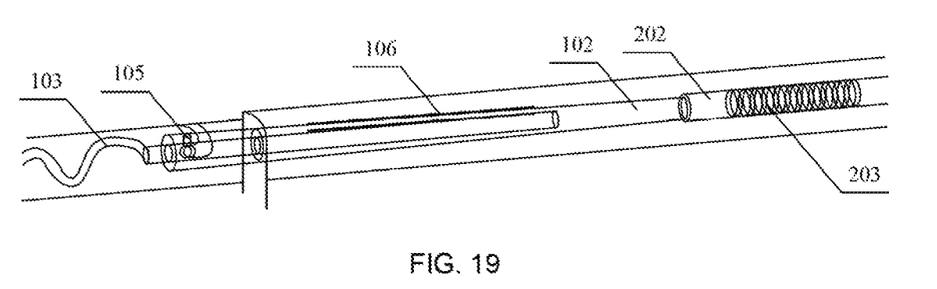
Figure 20:
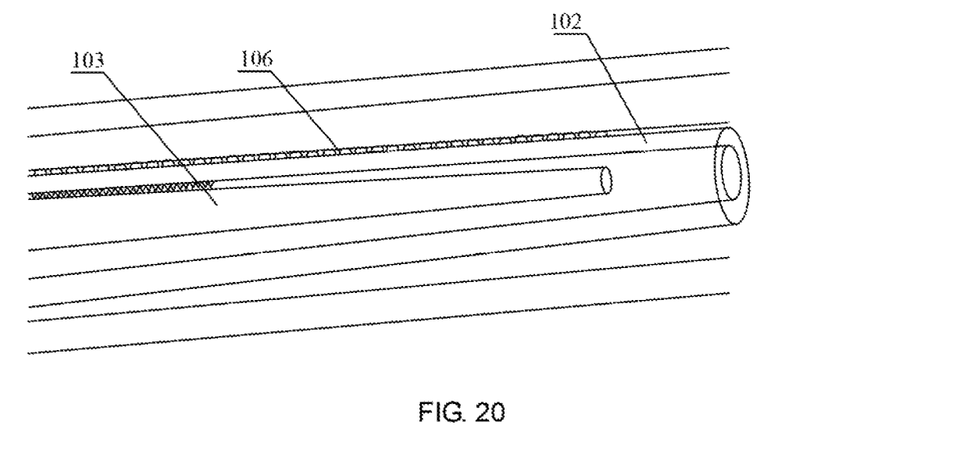

Next, the operating lever 105 is continuously pulled along the position-limiting groove 104 to move to the position G (finishing point of the position-limiting groove), as shown in FIG. 17. When the operating lever 105 is released, the operating lever 105 retracts to the position H under the pulling force of the spring cable, as shown in FIG. 18. At this time, the end of the connection shaft 102 is tightly abutted against the jacking cylinder 202 and generates the torque required for the dual-screen rotation. At the same time, a series of reeds 106 on the outer surface of the connection shaft 102 is in contact with the ring-shaped gold finger provided on the inner surface of the secondary housing 201 to be conductive, and a series of reeds 106 on the inner surface of the connection shaft 102 is in contact with the spring cable 103 to be conductive, thereby finally achieving the signal transmission of the dual-screen mobile phone, as shown in FIGS. 19 and 20. After realizing the signal connection of the dual-screen mobile phone, the primary body 1 and the secondary body 2 can be flipped freely, either flattened or folded.

In the mobile terminal provided in the embodiment, by designing the connection structure between the primary body and the secondary body as a detachable mechanism, the mobile terminal can be freely switched between the flip dual-screen phone and the ultra-thin bar phone. The primary body and the secondary body are connected and conductive by a detachable connection mechanism, which can be used as the dual-screen mobile phone. The primary body may be disassembled and separated from the secondary body, and the primary body can be used as the ultra-thin bar phone alone. The embodiment not only effectively solves the problem of the existing flip dual-screen phone with excessive large thickness, but also the detachable mechanism with integrated mechanical and electrical connections has the characteristics of simple structure, reliable connection, and convenient assembly and disassembly.

Second Embodiment

Based on the above-mentioned technical concept of the mobile terminal according to the embodiment of the present disclosure, an embodiment of the present disclosure further provides a method for controlling a mobile terminal, and the working mode of the mobile terminal is controlled by turning on and turning off signals between the primary body and the secondary body.

A method for controlling a mobile terminal according to an embodiment of the present disclosure includes:

S10, determining whether a single-screen detection contact and a detection reed are conductive, and if yes, providing a control signal that the mobile terminal is in a single-screen working mode, otherwise performing step S20;

S20, determining whether a multi-screen detection contact and the detection reed are conductive, and if yes, performing step S30, otherwise providing a control signal that the mobile terminal is in a single-screen working mode;

S30, determining whether the reed of the connection shaft and the gold finger on the inner surface of the secondary housing are conductive, and if yes, providing a control signal that the mobile terminal in the multi-screen working mode, otherwise providing a control signal that the mobile terminal in the single-screen working mode.

In the embodiment, on/off control of signals between the primary body and the secondary body is realized by a detection component. The detection component includes a detection reed, a single-screen detection contact, and a multi-screen detection contact. The detection reed is disposed on the connection shaft. The single-screen detection contact and the multi-screen detection contact are arranged on the inner wall of the position-limiting groove, respectively. Specifically, the detection component includes the detection reed disposed near the operating lever, the single-screen detection contact provided on the inner wall of the starting point of the position-limiting groove, and the multi-screen detection contact provided on the inner wall of the finishing point of the position-limiting groove. When the primary body is not connected to or ready to be connected to the secondary body, the operating lever is located at the starting point of the position-limiting groove. At this time, the single-screen detection contact is in contact with the detection reed to be conductive, and the conducting state is detected, which indicates that the primary body is not connected to the secondary body. The control signal for the mobile terminal in the single-screen working mode is provided. When the connection between the primary body and the secondary body has been completed, the operating lever is located at the finishing point of the position-limiting groove. At this time, the multi-screen detection contact is in contact with the detection reed to be conductive, and the conducting state is detected, which indicates that the primary body has been connected to the secondary body. The control signal for the mobile terminal in the multi-screen working mode is provided During the process of connecting the primary body with the secondary body, that is, during the process of the connection shaft of the primary body extending into the secondary housing of the secondary body, it is necessary to further detect whether the reed on the connection shaft and the gold finger are conductive. If the reed and the gold finger are not in the conductive state, which indicates that the connection between the primary body and the secondary body has not been completed, the control signal for the mobile terminal in the single-screen working mode is provided, and there are no electrical signals and data signals for the connection shaft. If the reed and the gold finger are in the conducting state, which indicates that the connection between the primary body and the secondary body has been completed, the control signal for the mobile terminal in the multi-screen working mode is provided, and the primary body transmits electrical signals and data signals to the secondary body through the connection shaft.

It can be seen from the control method of the embodiment that the embodiment uses multi-level detection to ensure that only when the connection between the primary body Wand the secondary body has been completed, the conversion of the single-screen working mode to the multi-screen working mode is activated, avoiding the screen display confusion caused by a user or by mobile phone hardware and software failures and having high working reliability.

In actual implementation, the signals transmitted by the primary body to the secondary body via the connection shaft may be electrical signals and data signals, or only the electrical signals may be transmitted, and the data signals are transmitted through wireless transmission methods such as Bluetooth and MR. After the multi-screen working mode is, activated, the mobile terminal may call different display states through different rotation angles of the primary body and the secondary body. The first connection mechanism may be retracted and ejected manually or automatically. For example, the first connection mechanism may be retracted and ejected using electromagnetic and electric driving.

The above embodiments describe the technical solutions of the present disclosure by taking the dual-screen structure as an example. However, in actual implementation, the mobile terminal in the embodiment of the present disclosure can not only implement the dual-screen structure, but also implement the multi-screen structure. For example, a second connection structure is provided on one side surface of the first secondary body, a first connection structure is, provided on the other side surface, and a second connection structure is provided on one side surface of the second secondary body, and three-screen structure including "primary body+ the first secondary body+ the second secondary body" may be achieved. For another example, the first connection structure is provided on each of both sides of the primary body, and the second connection structure is provided on the side of the first secondary body and the second secondary body, the three-screen structure including "the first secondary body+ the primary body+ the second secondary body" is also achieved.

In summary, the mobile terminal provided by the embodiments of the present disclosure can make the mobile terminal freely switch between the flip dual-screen phone and the ultra-thin bar phone by designing the connection structure between the two display screens as a detachable mechanism. The two display screens are connected to be conductive through a detachable connection mechanism, which can be used as a dual-screen mobile phone. The two display screens can be detached and separated, and the primary body can be used as the ultra-thin bar phone alone. In the embodiment of the present disclosure, the mobile terminal can not only realize the free conversion of the dual-screen mobile phone to the ultra-thin bar phone, but also realize modular upgrade of the mobile phone. For example, a rear camera of the original dual-screen mobile phone has 5 million pixels, and can be upgraded to 13 million pixels by replacing the secondary body. As another example, the display screen of the original secondary body has a lower resolution, and it can be upgraded to a high-definition screen by replacing the display screen of the secondary body. For another example, the secondary body can also have its own memory, and the effect of upgrading the memory of the entire phone can be achieved by replacing the secondary body.

In the description of the embodiments of the present disclosure, it should be understood that orientation or position relationships indicated by the terms "middle", "upper", "lower", "front", "rear", "vertical", "horizontal", "top", "bottom", "inside" and "outside" are based on the orientation or position relationships shown in the accompanying drawings, and are only intended to conveniently describe the present disclosure and simplify the description, rather than indicating or implying that devices or elements indicated must has a specific orientation and is constructed and operated in the specific orientation, which cannot be construed as a limitation on the present disclosure.

In the description of the embodiments of the present disclosure, it should be noted that, unless otherwise specified and defined, the terms "installation", "connected", and "connection" should be understood in a broad sense. For example, it may be fixed connection or detachable connection or integral connection; it may be mechanical connection or electrical connection; it may be directly connected, or it may be indirectly connected through an intermediate medium, or it may be internal connection between the two elements. For a person skilled in the art, the specific meanings of the above terms in the present disclosure may be understood on a case-by-case basis.

Although the embodiments disclosed the present disclosure are as described above, the contents described are only embodiments adopted for facilitating understanding of the present disclosure without any intention to be used for limiting the present disclosure. Forms and details of implementations may be modified and changed by any person skilled in the art to which the disclosure pertains without departing from the spirit and scope disclosed by this disclosure, but the scope of patent protection of this disclosure must still be subjected to the scope defined by the appended claims.

INDUSTRIAL APPLICABILITY

In the embodiments of the present disclosure, the mobile terminal can be freely switched between a flip dual-screen phone and an ultra-thin bar phone by designing a connection structure between two display screens as a detachable mechanism. The two display screens can be connected and conductive through a detachable connection mechanism, which can be used as the dual-screen mobile phone. The two display screens can be detached and separated and the primary body can be used as the ultra-thin bar phone alone with only the thickness of 6 mm. By adopting the embodiments of the present disclosure, not only the problem of the existing flip dual-screen phone with excessive large thickness is effectively solved, but also reliable signal transmission caused by using reeds and gold fingers and accurate signal connection caused by using position-limiting grooves and slot structure are ensured, so that the detachable mechanism integrating mechanical and electrical connections has the characteristics of simple structure, reliable connection, and convenient disassembly and assembly.

What is claimed is:

1. A mobile terminal, the terminal comprising:
 a primary body with a first display screen and at least one secondary body with a second display screen, at least one side of the primary body being provided with an accommodation mechanism and a first connection mechanism, and the first connection mechanism having a retracted state in which the first connection mechanism is accommodated in the accommodation mechanism and a protruded state in which the first connection mechanism is ejected from the accommodation mechanism; at least one side of the secondary body being provided with a second connection mechanism; the first connection mechanism in the protruded state being configured to connect with the second connection mechanism to make the primary body and the secondary body be combined into a multi-screen terminal.

2. The mobile terminal according to claim 1, wherein the accommodation mechanism comprises an accommodation cavity and an ejection mechanism, and the accommodation cavity is configured to accommodate the first connection mechanism and the ejection mechanism is configured to make the first connection mechanism be ejected from the accommodation cavity.

3. The mobile terminal according to claim 2, wherein the ejection mechanism comprises a push frame, a groove, a link, and an ejection spring; the push frame is disposed in the accommodation cavity, and one end of the push frame is abutted against the first connection mechanism, and the other end of the push frame is connected to a movable end of the ejection spring, and a fixed end of the ejection spring is fixedly connected to the primary body; the groove is provided in the push frame, and its top is a symmetrical sliding lock structure, and a through-hole is provided at the bottom; a fixed end of the link is fixedly connected to the primary body, and a movable end is inserted into the through-hole of the groove.

4. The mobile terminal according to claim 2, wherein the ejection mechanism is disposed at a middle portion of the accommodation cavity, or is disposed at both ends of the accommodation cavity, respectively.

5. The mobile terminal according to claim 1, wherein the first connection mechanism comprises a main housing, a connection shaft and a connection wire provided in an inner cavity of the main housing, and the connection shaft and the connection wire are configured to electrically connect with the secondary body.

6. The mobile terminal according to claim 5, wherein a surface of the main housing is provided with a strip-shaped position-limiting groove extending in an axial direction, and a raised operating lever is provided on the connection shaft, and the raised operating lever is slidably disposed in the position-limiting groove, and the operating lever is configured to control the connection shaft to retract or protrude from the main housing.

7. The mobile terminal according to claim 5, wherein an inner surface of the connection shaft is provided with a reed, one end of the connection wire connects with the primary body and is conductive, and the other end extends into the connection shaft, connects with the inner surface reed of the connection shaft and is conductive.

8. The mobile terminal according to claim 5, wherein an outer surface of the connection shaft is provided with a reed or a gold finger configured to electrically connect with the second connection mechanism.

9. The mobile terminal according to claim 5, wherein the connecting wire is a spring cable, and the spring cable comprises a rod-shaped cable and a spring, and the spring is nested on the rod-shaped cable.

10. The mobile terminal according to claim 1, wherein the first connection mechanism further comprises a detection component, and the detection component is configured to detect a conducting state between the first connection mechanism and the second connection mechanism, and further provide a control signal for controlling a working mode of the mobile terminal.

11. The mobile terminal according to claim 10, wherein the detection component comprises a detection reed, a single-screen detection contact, and a multi-screen detection contact, and the detection reed is disposed on the connection shaft, and the single-screen detection contact and the multi-screen detection contact are arranged on an inner wall of a position-limiting groove, respectively; when the detection reed is in contact with the single-screen detection contact to be conductive, a control signal for the mobile terminal in a single-screen working mode is provided; when the detection reed is in contact with the multi-screen detection contact to be conductive, a control signal for the mobile terminal in a multi-screen working mode is provided.

12. The mobile terminal according to claim 1, wherein the second connection mechanism comprises a secondary housing, and a jacking cylinder and a jacking spring arranged in the secondary housing, and an inner surface of the secondary housing is provided with a gold finger or a reed configured to contact with the connection shaft of the first connection mechanism to be conductive; one end of the jacking spring is connected to the secondary body, and the other end is connected to the jacking cylinder, and the jacking spring is configured to make the jacking cylinder be tightly abutted against the connection shaft of the first connection mechanism.

13. The mobile terminal according to claim 12, wherein the connection shaft is a conical rod body, and a diameter of an end of the conical rod body adjacent to the second connection mechanism is smaller than a diameter of an end away from the second connection mechanism; the secondary housing has a conical hollow cavity, and a diameter of an end of the conical hollow cavity adjacent to the first connection mechanism is larger than a diameter of an end away from the first connection mechanism.

14. The mobile terminal according to claim 12, wherein the gold finger or the reed on the inner surface of the secondary housing is disposed at an end away from the first connection mechanism, and the reed or the gold finger on the outer surface of the connection shaft is disposed an end adjacent to the second connection mechanism, so that the reed or gold finger on the outer surface of the connection shaft is not in contact with the gold finger or reed on the inner surface of the secondary housing when the connection shaft is partially inserted into the hollow cavity of the secondary housing, and the reed or gold finger on the outer surface of the connection shaft is in complete contact with the gold finger or reed on the inner surface of the secondary housing only when the connection shaft is completely inserted into the hollow cavity of the secondary housing.

15. A control method for the mobile terminal of claim 1, wherein the mobile terminal further comprises a detection component, and the detection component comprises a detection reed, a single-screen detection contact, and a multi-screen detection contact, and wherein the control method comprises:
providing a control signal for the mobile terminal in a single-screen working mode when it is determined that the single-screen detection contact and the detection reed are conductive; and
providing a control signal for the mobile terminal in a multi-screen working mode when it is determined that the multi-screen detection contact and the detection reed are conductive.

16. A mobile terminal, said terminal comprising:
a primary body having a first display screen, and at least one side of the primary body is provided with an accommodation mechanism and a first connection mechanism for combining a multi-screen terminal, and the first connection mechanism has a retracted state in which the first connection mechanism is accommodated in the accommodation mechanism and a protruded state in which the first connection mechanism is ejected from the accommodation mechanism, wherein the accommodation mechanism comprises an accommodation cavity and an ejection mechanism, and the accommodation cavity is configured to accommodate the first connection mechanism, and the ejection mechanism is configured to make the first connection mechanism be ejected from the accommodation cavity, and wherein the ejection mechanism is disposed at a middle portion of the accommodation cavity, or is disposed at both ends of the accommodation cavity, respectively; and the first connection mechanism comprises a main housing, a connection shaft and a connection wire provided in an inner cavity of the main housing.

17. The mobile terminal according to claim 16, wherein the first connection mechanism further comprises a detection component, and the detection component comprises a detection reed, a single-screen detection contact, and a multi-screen detection contact, and the detection reed is disposed on the connection shaft, and the single-screen detection contact and the multi-screen detection contact are arranged on an inner wall of a position-limiting groove, respectively; when the detection reed is in contact with the single-screen detection contact to be conductive, a control signal for the mobile terminal in a single-screen working mode is provided; when the detection reed is in contact with the multi-screen detection contact to be conductive, a control signal for the mobile terminal in a multi-screen working mode is provided.

18. A control method for a mobile terminal, wherein the mobile terminal comprises a primary body having a first display screen, and at least one side of the primary body is provided with an accommodation mechanism and a first connection mechanism for combining a multi-screen terminal, and the first connection mechanism has a retracted state in which the first connection mechanism is accommodated in the accommodation mechanism and an protruded state in which the first connection mechanism is ejected from the accommodation mechanism, wherein the accommodation mechanism comprises an accommodation cavity and an ejection mechanism, and the accommodation cavity is configured to accommodate the first connection mechanism, and the ejection mechanism is configured to make the first connection mechanism be ejected from the accommodation cavity, and the ejection mechanism is disposed at a middle portion of the accommodation cavity, or is disposed at both ends of the accommodation cavity, respectively, and wherein the first connection mechanism comprises a main housing, a connection shaft and a connection wire provided in an inner cavity of the main housing, and wherein the terminal further comprises a detection component, and the detection component comprises a detection reed, a single-screen detection contact, and a multi-screen detection contact; and the control method comprises:

providing a control signal for the mobile terminal in a single-screen working mode when it is determined that the single-screen detection contact and the detection reed are conductive; and providing a control signal for the mobile terminal in a multi-screen working mode when it is determined that the multi-screen detection contact and the detection reed are conductive.

19. The control method according to claim 18, wherein providing the control signal for the mobile terminal in the single-screen working mode when it is determined that the multi-screen detection contact and the detection reed are conductive, comprising:

when it is determined that the multi-screen detection contact and the detection reed are conductive, further determining whether a connection shaft of a primary body and a gold finger of a secondary housing are conductive, and if yes, providing a control signal for the mobile terminal in the multi-screen working mode, otherwise providing a control signal for the mobile terminal in the single-screen working mode.

20. The control method according to claim 18, wherein providing the control signal for the mobile terminal in the single-screen working mode when it is determined that the multi-screen detection contact and the detection reed are conductive, comprising:

when it is determined that the multi-screen detection contact and the detection reed are conductive, further determining whether a connection shaft of a primary body and a gold finger of a secondary housing are conductive, and if yes, providing a control signal for the mobile terminal in the multi-screen working mode, otherwise providing a control signal for the mobile terminal in the single-screen working mode.

* * * * *